United States Patent
Gosis et al.

(10) Patent No.: US 8,303,228 B2
(45) Date of Patent: Nov. 6, 2012

(54) METAL TO METAL CLEAT

(75) Inventors: Anatoly Gosis, Palatine, IL (US);
Anthony Caringella, Norridge, IL (US);
Yury Shkolnikov, Glenview, IL (US);
Kyle Thomas Kestner, Schaumburg, IL (US)

(73) Assignee: Illinois Tool Works Inc., Glenview, IL (US)

( * ) Notice: Subject to any disclaimer, the term of this patent is extended or adjusted under 35 U.S.C. 154(b) by 585 days.

(21) Appl. No.: 12/482,287

(22) Filed: Jun. 10, 2009

(65) Prior Publication Data
US 2009/0320328 A1 Dec. 31, 2009

Related U.S. Application Data

(60) Provisional application No. 61/061,434, filed on Jun. 13, 2008.

(51) Int. Cl.
*F16B 15/06* (2006.01)

(52) U.S. Cl. ............... 411/477; 411/476; 411/451.3; 411/5

(58) Field of Classification Search ............. 411/2, 3, 411/5, 443, 450, 451.3, 477, 488, 489, 476
See application file for complete search history.

(56) References Cited

U.S. PATENT DOCUMENTS

| | | | | |
|---|---|---|---|---|
| 975,235 A * | 11/1910 | Hansen | | 411/476 |
| 1,511,746 A * | 10/1924 | Noll | | 411/177 |
| 2,428,259 A * | 9/1947 | Anstett | | 411/443 |
| 2,438,793 A * | 3/1948 | Vogel | | 227/142 |
| 3,304,106 A * | 2/1967 | McCormack | | 403/306 |
| 3,882,755 A | 5/1975 | Enstrom | | |
| 4,122,752 A | 10/1978 | Hallock | | |
| 4,289,058 A | 9/1981 | Paskert | | |
| 5,971,688 A * | 10/1999 | Anstett | | 411/456 |
| 6,659,700 B1 | 12/2003 | Farrell et al. | | |
| 6,719,512 B2 | 4/2004 | Berry et al. | | |
| 6,817,818 B2 | 11/2004 | Farrell et al. | | |
| 6,862,864 B2 | 3/2005 | O'Banion et al. | | |
| 6,905,299 B2 | 6/2005 | Moores, Jr. | | |
| 6,938,452 B2 | 9/2005 | Rudolph et al. | | |
| 7,008,157 B2 | 3/2006 | O'Banion et al. | | |
| 7,014,408 B2 | 3/2006 | O'Banion et al. | | |
| 7,077,613 B2 | 7/2006 | Rudolph et al. | | |
| 7,097,405 B2 | 8/2006 | O'Banion et al. | | |
| 7,165,710 B2 | 1/2007 | O'Banion et al. | | |
| 2004/0250504 A1 | 12/2004 | Leek et al. | | |
| 2005/0120541 A1 | 6/2005 | O' Banion et al. | | |
| 2006/0228192 A1 * | 10/2006 | Chang | | 411/451.3 |
| 2006/0254189 A1 | 11/2006 | O'Banion et al. | | |
| 2008/0063491 A1 * | 3/2008 | Ringl | | 411/476 |
| 2008/0086979 A1 | 4/2008 | O'Banion et al. | | |
| 2008/0089760 A1 * | 4/2008 | Yao | | 411/477 |
| 2008/0131233 A1 | 6/2008 | Yao | | |

FOREIGN PATENT DOCUMENTS

FR 1 197 693 12/1959

* cited by examiner

*Primary Examiner* — Flemming Saether

(74) *Attorney, Agent, or Firm* — Greer, Burns & Crain, Ltd.; Patty Chidiac; Mark W. Croll

(57) ABSTRACT

A cleat is provided, including a head and a shank connected to the head. The shank has a pair of opposing planar faces and a pair of opposing short edges, a wide portion and a point. The edges are provided with at least one serration fixed relative to the wide portion.

14 Claims, 3 Drawing Sheets

METAL TO METAL CLEAT

RELATED APPLICATION

This application claims priority pursuant to 35 USC §119 (e) from U.S. Provisional Application Ser. No. 61/061,434 filed Jun. 13, 2008.

BACKGROUND

The present invention relates to fasteners, and specifically fasteners used to connect light-gauge sheet metal in commercial construction.

Light-gauge metal studs may be used to frame walls for commercial construction, particularly when framing interior, non-load bearing walls. When metal studs are used, generally U-shaped tracks are installed at the top and bottom of a wall attached respectively to upper and lower substrates, and C-shaped, vertically oriented studs are fit within the tracks at regular intervals. Fasteners such as self-tapping sheet metal screws are typically used to connect the metal studs to the tracks. Such screws require the use of a manual or powered screwdriver, and take longer to install when compared to other types of fasteners, such as nails or brads. Additionally, screws are typically carried in a small pouch worn at a user's belt. The user removes screws from the pouch one at a time as needed, further slowing down the installation process. In some cases, it may also be necessary to clamp the stud to the track to prevent the stud from bending or warping. This clamping still further slows the installation and framing process.

On the other hand, fasteners such as nails and brads are generally faster to install than screws, and can be loaded into magazines, which speeds the required installation time. However, nails and brads typically cannot securely fasten multiple pieces of sheet metal to one another. Also, the force used to drive nails and brads into the sheet metal tends to push the stud away from the track, forming an undesirable gap between the track and the stud.

Thus, there is a need for an improved fastener that addresses the drawbacks identified above.

SUMMARY

The present metal to metal cleat addresses the above-identified needs by providing a fastener that is both quickly installed and provides a secure connection between the metal framing elements. For this purpose, a metal cleat is formed that will tack the track and the stud together. The cleat has a head and a shank, and the shank is divided into a wide portion, a tapered portion, a narrow portion, and a point.

The cleat is made of metal, and is formed to have two relatively short opposing edge walls and two opposing side walls. This configuration gives the cleat a generally rectangular cross-section. At least a portion of the cleat's edge walls are preferably serrated, and the geometry of the shank causes the tabs to be formed in the metal track and stud when the cleat is inserted. These tabs help to tack the track and stud together. Additionally, the cleat can be used with commercial powered fastener drivers, such as pneumatic, electronic, or combustion tools, allowing for quick installation.

More specifically, a cleat is provided, including a head and a shank connected to the head. The shank has a pair of opposing planar faces and a pair of opposing short edges, a wide portion and a point. In the preferred embodiment, the edges are provided with at least one serration fixed relative to the wide portion.

In another embodiment, a cleat is provided for use with a powered fastener driver for securing metal studs to a metal guide track, and includes a head, a shank connected to the head, the shank having a pair of opposing planar faces and a pair of opposing short edges, and the head being connected to the shank by a breakaway joint.

In a further embodiment, a cleat is provided for use with a powered fastener driver for securing metal studs to a metal guide track, and includes a head and a shank connected to the head, having a pair of opposing planar faces and a pair of opposing short edges, a wide portion and a point. The edges are provided with at least one serration dimensioned so that as the shank is driven to secure the stud to the guide track, metal tabs are formed in the guide track, and the serrations hold the cleat in place relative to the tabs to tack the track and the stud together.

DETAILED DESCRIPTION

Figure 1:
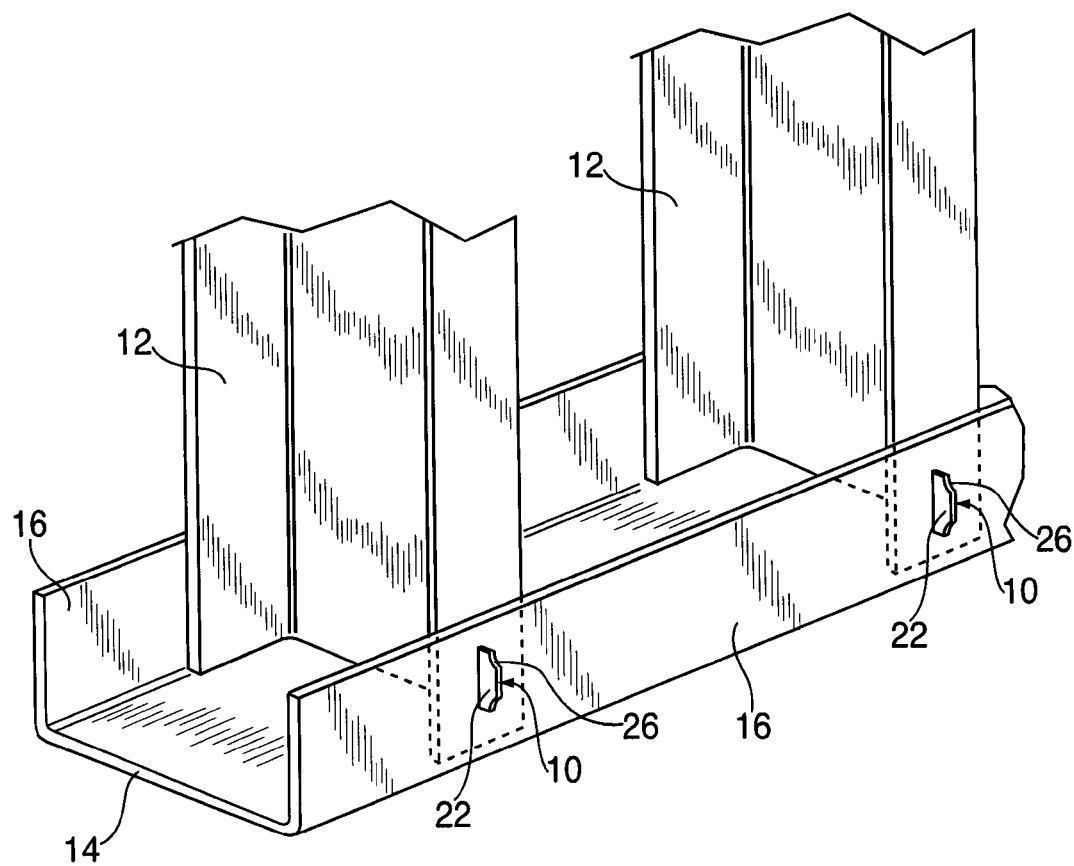
FIG. 1 is a fragmentary top perspective view of studs connected to a guide track using the present cleat.
Figure 5:
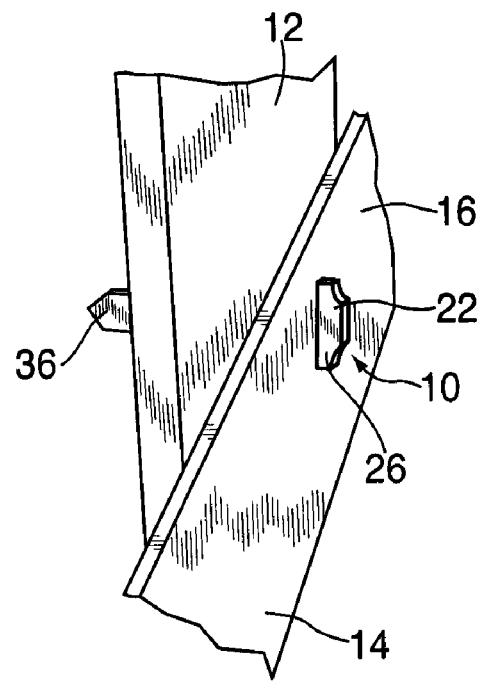
FIG. 5 is a fragmentary top perspective view of the present fastener as depicted in FIG. 4.

Referring now to FIGS. 1 and 5, the present cleat, generally designated 10 is a fastener preferably used to join two pieces of light-gauge sheet metal, such as that used in forming a metal stud 12 and a track 14 for wall framing. Each stud 12 is inserted between two upright walls 16 of the track 14. The cleat 10 is driven through one upright wall 16 of the track 14 and the stud 12, and helps to prevent the stud from moving relative to the track.

Figure 2:
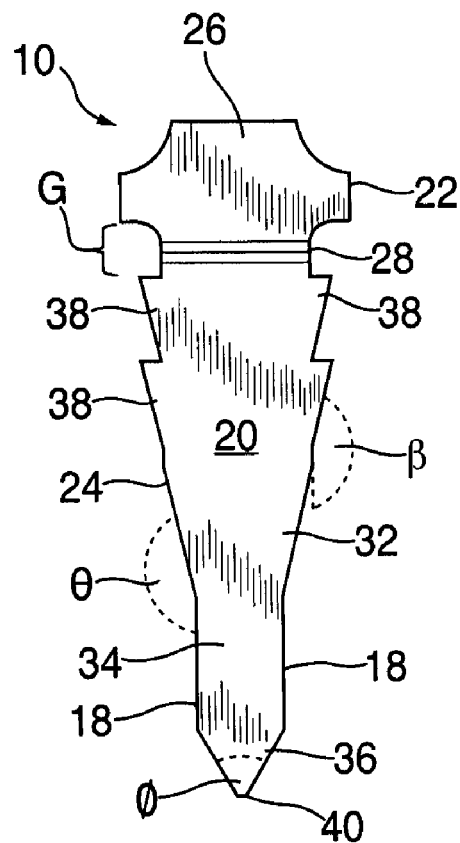
FIG. 2 is a front view of the present cleat.
Figure 3:
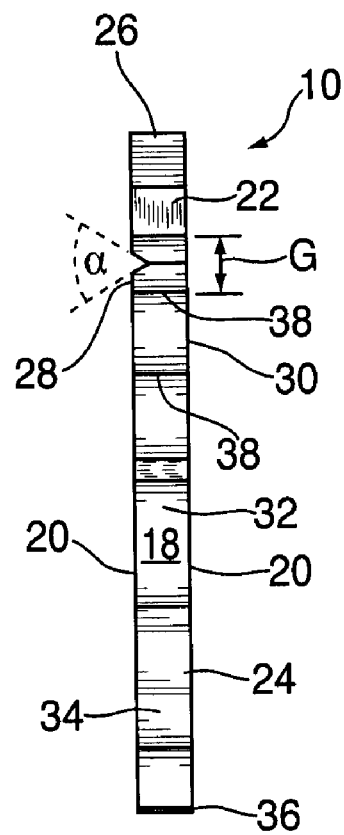
FIG. 3 is a side view of the cleat of FIG. 2.

As shown in FIGS. 2 and 3, the cleat 10 is relatively flat or planar, and is preferably formed using light-gauge sheet metal, which is approximately 0.062 inches thick. Thus, the cleat 10 has two opposing short edges 18, which have a height of approximately 0.06 inches and two opposing planar faces 20. The edges 18 and faces 20 give the cleat 10 a generally rectangular cross-section. Each of the cleats 10 is approximately 0.7 to 0.8 inches long and approximately 0.25 to 0.28 inches wide, at the widest part. Cleats 10 are preferably formed from 16 gauge sheet of metal by stamping, laser cutting, or water jet cutting, although different sheet metal thicknesses, dimensions and production techniques are contemplated depending on the application.

The cleat 10 has a removable head 22 and a shank 24. The head 22 of the cleat 10 is the widest portion of the fastener, having a preferred width of approximately 0.25 to 0.28 inches. It is also preferred the head 22 has a low profile, accounting for less than 20% of the overall length of the cleat 10. Preferably, the head 22 extends laterally approximately 0.0475 inches beyond each lateral edge of the shank 24. This relatively low profile allows drywall to be placed over the head 22 without showing a noticeable bulge where the drywall contacts the fastener head. The head 22 also optionally includes a tab 26 that provides additional surface area for a user to grip the cleat 10 after the cleat has been driven into the track 14 and the stud 12.

Referring now to FIG. 3, a breakaway joint 28 connects the removable head 22 to the shank 24 and allows for easy removal of the cleat. The breakaway joint 28 is preferably formed from a beveled notch located at least on one of the planar faces 20 where the head 22 meets the shank 24. The notch forms an angle a of approximately 57° to 63°, although other angles are contemplated. To remove the cleat 10 from the metal track 14 and stud 12, a user grips the removable head 22 with a pair of pliers or the like, and rotates the head relative to the shank 24. This rotation causes the removable head 22 to break off from the shank 24 at the breakaway joint 28, allowing the user to dispose of the head, and allowing the shank to fall away. The joint 28 also defines a gap "G" between the head 22 and the shank 24 that is large enough to accommodate two layers of light-gauge metal. The defined gap "G" is preferably about 0.06 to 0.07 inches, but any thickness sufficient to accommodate the two layers of sheet metal is acceptable.

The shank 24 of the cleat 10 is preferably unitary and is generally stepped, having a wide portion 30, a tapered portion 32, a narrow portion 34, and a point 36, each of the above disposed in sequential order and being fixed relative to each other. The above-described rectangular cross-section of the shank is particularly noticeable at the wide portion 30. In addition, the wide portion 30 is adjacent to the breakaway joint 28 and has a width of approximately 0.170 inches. Serrations 38 are preferably formed along at least a portion of the edges 18 of the wide portion 30. Typically, two serrations 38 are formed on each edge 18, and each serration is approximately 0.100 inches long and extends outwardly approximately 0.025 inches from the edge of the wide portion 30. Each of the serrations 38 forms an angle $\beta$ of approximately 164° to 168° with respect to the corresponding edge 18. However, different serration measurements and/or more serrations are contemplated.

The tapered portion 32 of the shank 24 is disposed between the wide portion 30 and the narrow portion 34. In the preferred embodiment, the width of the tapered portion 32 narrows constantly from approximately 0.170 inches adjacent to the wide portion 30 to approximately 0.100 inches adjacent to the narrow portion 32. Each of the edges 18 of the tapered portion 32 forms an angle $\theta$ of approximately 153° to 157° with respect to the corresponding edge 18 of the narrow portion 34. As stated above, it is contemplated that these dimensions and angles may vary with the application.

The narrow portion 34 of the cleat 10 is adjacent to the tapered portion 32. The narrow portion 34 has a width of approximately 0.080 to 0.125 inches, and is preferably approximately 0.100 inches wide. The edges 18 of the narrow portion 34 are preferably smooth.

The point 36 of the shank 24 is located adjacent to the narrow portion 34, and furthest from the head 22. The point 36 has a width that tapers uniformly from approximately 0.075 to 0.125 inches adjacent to the narrow portion 34 to a tip 40 furthest away from the narrow portion. The edges 18 of the point 36 form an angle $\phi$ of approximately 57° to 63° with respect to one another. The tip 40 of the point 36 must be sharp enough to pierce through light gauge sheet metal when a sufficient amount of force is provided. However, many manufacturing methods do not allow for a sharp tip. Thus, the tip 40 is preferably radiused. The radius of curvature provided for the tip 40 is approximately 0.010 inches. While a radiused tip is preferable, it is also contemplated that the tip is angular. As stated above, it is contemplated that these dimensions and angles may vary with the application.

The cleats 10 are collated into strips of 50 or 100 units using a known collation method such as glue, paper, or the like. The collated cleats 10 can then be loaded into a fastener driver tool for rapid sequential installation. The cleats 10 can be driven into light-gauge metal such as that used in the track 14 and stud 12, and the amount of force applied by the fastener driver is sufficient to alleviate bending and warping that could occur when using hand tools such as a hammer.

Figure 4:
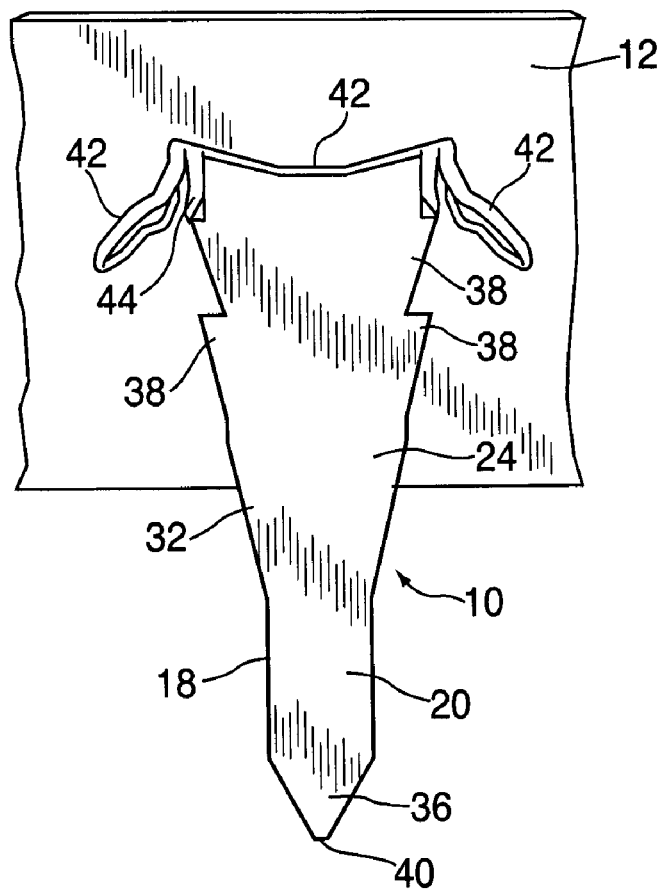
FIG. 4 is a fragmentary top perspective view of the present cleat after being driven into adjoining portions of a stud and support track per FIG. 1.

In operation, a fastener driver holding the cleats 10 is placed in contact with the upright wall 16 of the metal guide track 14 that holds a metal framing stud 12. When a cleat 10 is fired into the track 14 and stud 12, the point 36 penetrates both layers of sheet metal. As shown in FIGS. 4-5, the shape of the edges 16 causes the metal to tear into individual tabs, including stud tabs 42 and track tabs 44. Then the geometry of the stepped shank 24 forces the track tabs 44 torn from the upright wall 16 of the guide track 14 to push through the metal stud 12. The serrations 38 on the wide portion 30 of the shank 24 act as a tacking mechanism, holding the cleat 10 in place relative to the tabs 42, 44 that were formed. The tacking mechanism provided by the serrations 38 increases the force required to push a cleat 10 out of the stud, such that the average push out force is about 100 pounds.

While a particular embodiment of the cleat has been described herein, it will be appreciated by those skilled in the art that changes and modifications may be made thereto without departing from the invention in its broader aspects and as set forth in the following claims.

What is claimed:

1. A cleat, comprising:
    a head;
    a shank connected to said head, having a pair of opposing planar faces and a pair of opposing short edges, a wide portion and a point;
    said edges are provided with at least one serration fixed relative to said wide portion;
    said shank having a constant width in a shank portion separating said head from said at least one serration; and
    a breakaway joint located in said constant width portion of said shank, extending from one of said short edges to the other and including a beveled notch located on at least one of said planar faces where said head meets said shank.

2. The cleat of claim 1 further including at least a pair of serrations in said wide portion on each said edge, said serrations extending laterally wider progressing toward said head.

3. The cleat of claim 1 wherein said head is wider than any point on said shank.

4. The cleat of claim 1 wherein said head accounts for approximately less than 20% of a total length of said cleat.

5. The cleat of claim 1 wherein said breakaway joint is configured for facilitating detachment of said head from said shank and removal of said cleat once driven.

6. The cleat of claim 1 wherein said constant width portion defines a gap in each said edge formed between said head and said at least one serration, said gap dimensioned to accommodate thicknesses of a stud and a track.

7. The cleat of claim 1 having a generally rectangular cross-section taken at said wide portion.

8. The cleat of claim 1 further including a tapered portion between said wide portion and said point, wherein said tapered portion is formed by said edges tapering uniformly to form an angle of approximately 50° with respect to one another.

9. The cleat of claim 1 wherein each said serration forms an angle in the range of 164° to 168° with respect to said edge.

10. The cleat of claim 1 further including a narrow portion extending from said point toward said head, said narrow portion has generally parallel edges and is narrower than said wide portion.

11. The cleat of claim 10 further including at least one serration in said wide portion and also including a tapered portion located between said narrow portion and said wide portion, said parallel edges being non-serrated in said tapered portion.

12. A cleat for use with a powered fastener driver for securing two layers of metal, said cleat comprising:
- a head;
- a shank connected to said head, said shank having a pair of opposing planar faces and a pair of opposing short edges;
- said head being connected to said shank by a breakaway joint; and
- a gap in said short edges between laterally extending portions of said head and at least one serration, said gap being adjacent a constant width portion of said shank extending from said head to said at least one serration, and said gap being located at said breakaway joint and configured for accommodating thicknesses of the two layers of metal.

13. The cleat of claim 12 wherein said shank includes a wide portion, a tapered portion and a point, and said at least one serration extends from each said edge.

14. The cleat of claim 12 wherein said breakaway joint is formed by a notch.

\* \* \* \* \*